Sept. 22, 1953 C. E. SCHOU 2,652,913
CENTRIFUGALLY BALANCED FLUID CLUTCH
Filed March 18, 1949 4 Sheets-Sheet 3

Fig. 3.

Inventor
Carl Einar Schou,
By Ralph L. Bassett
Attorney

INVENTOR
Carl Einar Schou,
BY Ralph L. Bassett
ATTORNEY

Patented Sept. 22, 1953

2,652,913

UNITED STATES PATENT OFFICE 2,652,913

CENTRIFUGALLY BALANCED FLUID CLUTCH

Carl Einar Schou, Seattle, Wash., assignor to Pacific Car and Foundry Company, Renton, Wash.

Application March 18, 1949, Serial No. 82,195

14 Claims. (Cl. 192—87)

This invention relates to improvements in fluid clutches such as are utilized for the transmission of power from a prime mover to a driven member, and comprehends a structure in which the clutching action is positive, dragging of the clutch plates or accidental engagement prevented, and difficulties experienced as a result of leakage eliminated.

One of the primary features of this invention is the construction of the fluid actuating mechanism for the clutches, each of the mechanisms including a spaced pair of resilient, concave, annular pressure plates or diaphragms which are connected and sealed at their marginal edges, the inner marginal edges being connected by a ring permitting unit shifting of the pairs of annular plates, while the outer marginal edges are clamped between portions of the drum-like sectional flywheel structure. Confined between the pressure plates at their outer marginal edges and between the sectional drum flywheel are the medially arranged partitions or fixed backing plates, one backing plate extending between each pair of concave annular pressure plates and providing laterally spaced fluid chambers, so that introduction of fluid into either chamber defined by an annular pressure plate and the adjacent face of the medial backing plate will result in a simultaneous shifting of the two diaphragms without deformation, to a position to engage and operate an associated clutch pressure plate.

Another object of this invention is to provide pressure actuated means in the form of spaced connected preshaped diaphragms which are so constructed and arranged that the operating force of the fluid on the plate acts always in a horizontal direction or in a direction of the axis of the supporting shaft whereby unbalancing of the structure due to canting is eliminated.

A further object of this invention is to provide a clutch operating structure in the form of a pair of spaced concave diaphragms of light resilient metal capable of retaining their concave contour during displacement under pressure, and which are sealed at their outer and inner ends to provide a fluid chamber which is divided by an intermediate backing plate to form high and low pressure chambers having similar pressure areas.

Another object of the invention is to provide a fluid clutch chamber including a pair of spaced concave diaphragms in which high and low pressure chambers are formed by a fixed intermediate backing plate, these chambers being of the same approximate size and filled with oil under predetermined pressure, which under centrifugal force, due to rotation, creates a fluid reaction providing a balanced static condition, this static condition being readily unbalanced by application of a predetermined additional operating pressure in the high pressure chamber to cause a desired clutch operating movement.

It is a further object to provide a fluid actuated structure of the type in question in which the provision of concave diaphragms of relatively thin metal inherently provide for a constant direction of force corresponding to the direction of the longitudinal axis of the structure or otherwise stated, horizontally of the structure.

Other objects provide for the cooling of the diaphragms whereby air is passed freely along and about each of the diaphragms and radially from the casing through slots and perforations formed in the wall of the casing; to provide a hydraulic system in which all of the sealing mediums are so constructed and arranged as to never be exposed to the sand and dirt that might find its way into the clutch housing but in which the seals are all interior of the chamber structure, and in which all pressures are uniform in and around the entire periphery of each of the elements and the engagement of the clutches will inherently be smooth and flawless.

Other objects of this invention will more clearly hereinafter appear by reference to the accompanying drawings and specification wherein like characters of reference designate corresponding parts throughout the several views, in which.

In the illustrations the present clutch is shown as associated with a seven-speed planetary of the type forming the subject matter of another application Ser. No. 2,293, filed January 14, 1948, and now Patent Number 2,529,423, issued November 7, 1950, of which the instant application is a continuation-in-part, this planetary utilizing three planetary gear trains in which the relative speeds are accomplished through the use of the instant clutch assembly and associated friction drums.

Figure 1:
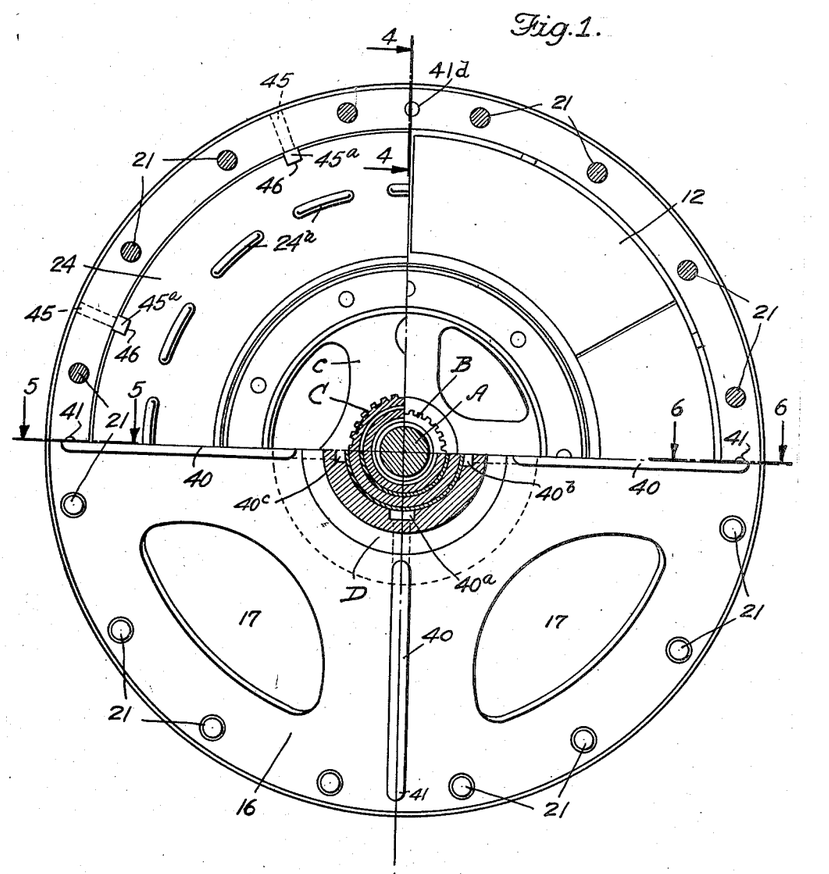
Fig. 1 is an end view partly in section of the clutch assembly.

Referring now to the clutch structure, there is illustrated in Fig. 1 three driven shafts indicated by reference characters A, B and C, these shafts being concentric, with the central shaft A projecting beyond the end of the intermediate hollow shaft B and the end of this intermediate hollow shaft projecting outwardly from the end of the hollow outer shaft C, the exposed portions of each shaft providing a support for the spiders *a*, *b*, and *c* which carry the driven discs 10, 11 and 12, respectively. The spiders *a*, *b*, and *c* are suitably splined to the ends of the shafts A, B, and C as is conventional in such instances. Also the discs 10, 11 and 12 are generally of conventional form.

The shafts A, B, and C are arranged in and confined by the tubular housing D, this housing D being provided with annular flange 14 to which is secured as by rivets 15, the slotted concave housing plate 16. The slots in the housing may be of any form or design to permit essential cooling by air flow and are indicated by the reference character 17 in Fig. 1. The housing embodies a cylinder structure enclosing the clutch units, this cylinder structure being fabricated to embody supporting means for the outer backing plates 18—18 for the two inner clutch assemblies, the outer backing plate for the clutch 10 being provided by the flywheel as indicated at 19. Arranged alternately of the backing plates 18 are the inner fixed annular concave partitions 20 which are located within each of the three fluid chambers defined by the diaphragms. The backing plates 18 and 19 and the fixed concave inner backing plates or partitions 20 are positioned and secured by elongated bolts 21 suitably spaced about the marginal edge of the casing assembly, the bolts extending into and supporting the casing from the flywheel 19. It will be noted that each of the backing plates 18 have lateral flange portions 18ª tending to elongate the housing. The housing wall 16 has its marginal edge 22 flattened to receive the head 23 of the elongated bolts 21 so that the parts can be clamped together. Also clamped between the alternate backing plates and partitions are the metallic concave diaphragms 25, these plates having their outer marginal edges sealed by rubber gaskets 26 to prevent leakage at their outer ends. The inner ends of the diaphragms 25 are fixed in annular grooves formed at the outer faces of the ring or piston elements 27, seals or packing rings 28 being provided between each of the plates and the abutting wall of the annular projection 29 of the pistons to effect a seal at this end of the plates and to provide between each pair of diaphragms 25 a sealed chamber which is partitioned by the annular concave backing element 20. The diaphragms 25 will preferably be of the type of the Belleville washer and may be made from suitable steel alloy or from copper or any other desired material capable of providing the requisite factors including inherent relatively stiff resiliency which will result in the diaphragms normally retaining or assuming a fixed predetermined position while permitting these diaphragms to shift together under pressure from a suitable fluid solution as will be hereinafter more fully described.

The inner annular edge of the backing plates 20 are each provided with a suitable seal 30 which engages the adjacent outer annular face of the extension 29 of annular piston 27 to provide a suitable sealing relation therebetween. Each of the diaphragms 25 of each of the fluid chamber units of each clutch actuating assembly is so spaced as to provide at each side of the inner backing partition 20 chambers of substantially the same capacity. Spring clips 24ª are interposed at predetermined positions between the active clutch pressure plates 24 and the inner ring pistons 27 of the fluid chambers to assist in maintaining these clutch plates 24 in position and to function as anti-rattling devices. The active pressure plates 24 are each slidably mounted on the outer casing by a number of spaced pins, one of which is indicated by reference character 45, see Fig. 3. These pins are pressed into the outer casing and fit into transverse slots in the outer peripheral edge of each of the pressure plates 24. The pressure plates 24 consequently can move longitudinally as shown in Fig. 1 of the drawings. The grooves 46 which are milled in the outer peripheral edge of the pressure plates cooperate with the square heads 45ª of the pins, these square heads of the pins riding in the milled groove and keeping the pressure plates aligned and permitting their longitudinal movement. The limitation of movement of each of the pressure plates is determined by the diaphragms on one side and the clutch plate on the other. Normally the clearance between the clutch plates 10, 11 and 12, and pressure plates 24 is preferably in the order of $\tfrac{1}{32}''$. The movement of the diaphragm to cause clutch engagement of the plate need not be more than $\tfrac{1}{32}''$.

Inasmuch as each of the chambers provided at each side of the backing plate 20 by the arrangement of the diaphragms 25 are normally substantially of the same capacity and with the same pressure areas and are adapted to contain fluid, it will be apparent that at high speed rotation there will be a normal tendency of the clutch to operate due to the centrifugal force of the fluid acting against the plates. Due to the closed chamber formed by the structure, the centrifugal forces acting on the fluid creates energy which will act in all directions inside of the chamber thus creating centrifugal forces under all conditions which are in equilibrium regardless of speed. The static condition created by centrifugal force is subject to unbalance by a variation of the pressure in the high pressure side of the clutch assembly, this unbalance creating the operating pressure provided in the structure for movement of the active pressure plates of the clutch assemblies. It will be noted that the size of the low pressure chamber will provide sufficient clearance to permit extra movement compensating for clutch wear.

Figure 2:
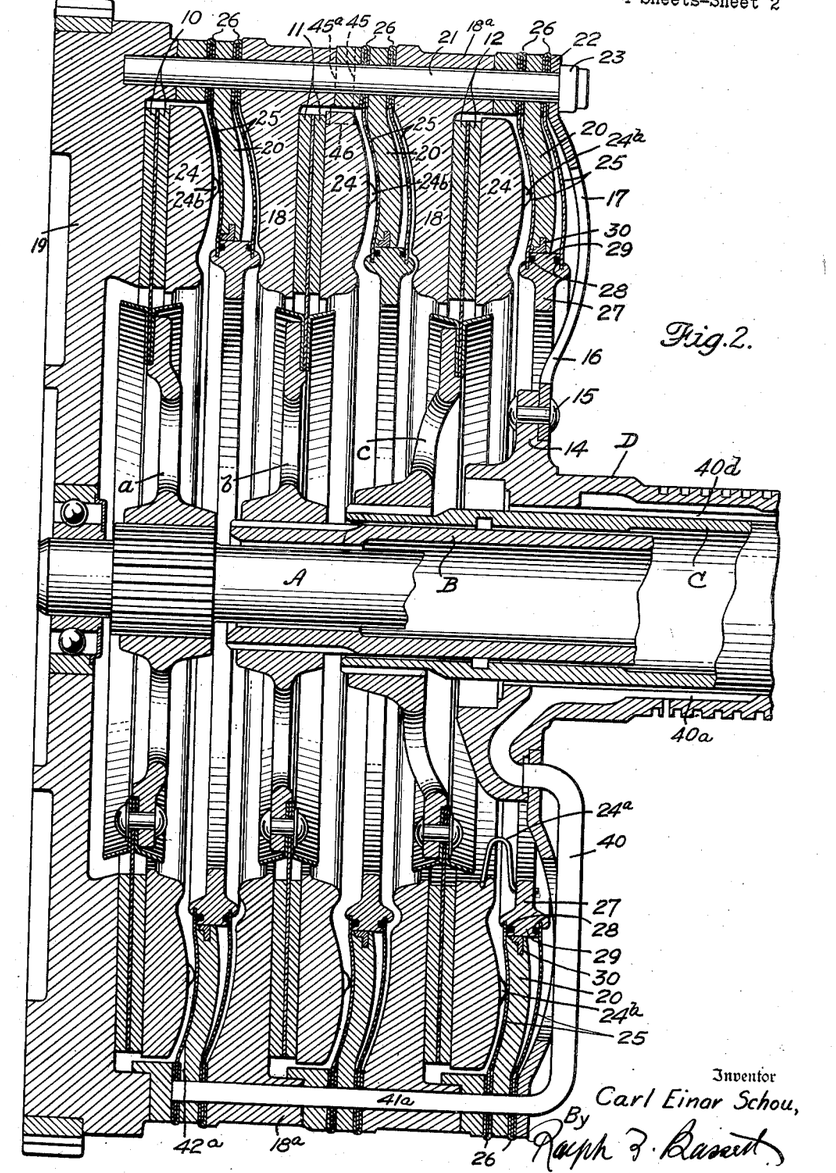
Fig. 2 is a vertical section through the clutch structure.
Figure 4:
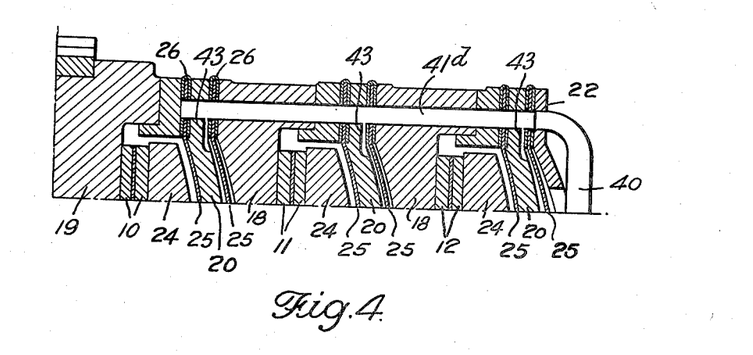
Fig. 4 is a transverse section on line 4—4 of Fig. 1.
Figure 5:
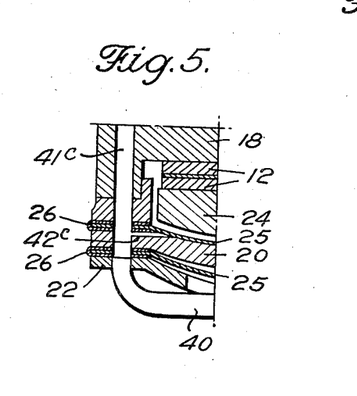
Fig. 5 is a transverse section on line 5—5 of Fig. 1.
Figure 6:
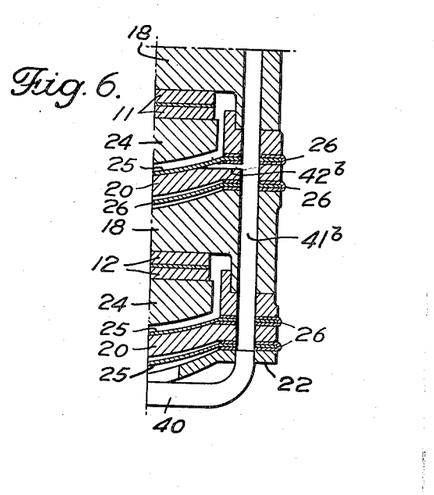
Fig. 6 is a transverse section on line 6—6 of Fig. 1.

The hub structure D is shown as provided with four hub ports 40ª, 40ᵇ, 40ᶜ and 40ᵈ, the ports 40ª, 40ᵇ, and 40ᶜ being shown in Fig. 1, while the port 40ᵈ is illustrated in Fig. 2. Four conduits indicated by reference character 40 are each connected at one end with the ports 40ª, 40ᵇ, 40ᶜ and 40ᵈ and at their other ends communicate with the drilled longitudinal conduits or ports 41ª, 41ᵇ, 41ᶜ and 41ᵈ which are formed in the wall structure of the housing and are preferably uniformly spaced about the structure. In Fig. 2 the port or conduit 41ª communicates with the inlet 42ª formed in the wall of the backing member 20 to permit the flow of high pressure fluid into the high pressure side of the fluid motor actuating clutch *a*. In Fig. 4 the conduit 41ᵈ is in communication through passages 43 with the low pressure side of the three fluid motors so that low pressure fluid is always available to these motors. In Fig. 5 the conduit 41ᶜ is shown in communication with the outer fluid motor actuating clutch c through port 42ᶜ to supply high pressure fluid and in Fig. 6 the conduit 41ᵇ is shown in communication through duct 42ᵇ with the medial motor which actuates clutch b to supply high pressure fluid thereto. The longitudinally extending passages 41ᵃ, 41ᵇ, 41ᶜ and 41ᵈ which extend longitudinally of the housing for transmitting the high and low pressure fluid to the several motors is shown as extending the full length of the motor with the lateral ports transmitting the fluid to the high or low pressure sides of the motors properly positioned as indicated in the several views. Each fluid chamber as comprehended by the fixed backing plates 20 and the diaphragms 25 are provided with a high pressure inlet 42ᵃ, 42ᵇ, 42ᶜ and 42ᵈ, which will be supplied with a fluid under pressure, for instance, approximately 130 lbs. The opposite chamber in each of the fluid motors is provided with suitable communications through ducts to normally supply fluid at low pressure, say 60 lbs., to the low pressure side of the cylinder. The low pressure side of each of the cylinders is normally in communication with the same source of supply.

As previously stated the diaphragms 25 are so constructed as to provide the necessary tension to normally maintain the piston or ring 27 at approximately the position illustrated in Fig. 1, in which position the clutches are disengaged. This normal position of the diaphragms which is maintained by the inherent tension of the diaphragm structures provides in cooperation with medial backing plates 20, the high and low pressure chambers. The pressure chambers may contain low pressure fluid at all times so that the operation of the various clutches is accomplished by overcoming the pressure in the low pressure chamber, plus the inherent spring reaction of the plates due to their structure. The diaphragms for the low pressure chamber are normally free of contact of the pressure plates 20 and therefore the pressure in the low pressure chamber is not sufficient to distort the low pressure diaphragm but only sufficient to maintain both the diaphragms in their normal unsprung position. The pressure on the diaphragms is not determined by the volume between the diaphragms and the backing plate but only by the area in the longitudinal projection. Thus it will be seen that while both the low and high pressure chambers may be capable of substantially the same volume, one may contain less volume, but this is not important because the actual working pressures as defined by the pressure areas are in the direction of the longitudinal axis or horizontally of the structure. In order that the effective pressure in both the high and low pressure chambers may be accordingly provided, the arrangement is such that the pressure plate faces in both the high and low pressure chambers never snugly engage the diaphragms so that portion of the diaphragm area is never blocked against pressure action. This is obviously provided for by the structure of the parts and the selection of material from which the diaphragms are made, this material, as heretofore stated, being inherently sufficiently resilient that the diaphragms maintain their normal predetermined concave shape at all times including the time of their shifting. The shape of the diaphragms is fairly critical and may affect the successful operation of the device and of the pressure which acts upon the clutch and thus this feature of the development is of prime importance. In addition, inasmuch as the operation of the diaphragms corresponds substantially to the movement of the piston in that the direction of the force is constant, the nature of the material used, as well as the shape of the diaphragm, and its thickness are all features of paramount importance.

An annular bead 24ᵇ is arranged medially of each pressure plate 24 at its outer face and against which the adjacent diaphragm or pressure plate operates, the bead 24ᵇ providing an annular surface of contact with the fluid motor and preventing excess frictional engagement of an unnecessarily large area. When high pressure fluid is forced in between the adjacent diaphragm and the enclosed partition or backing plate 20, the inner ring 27 which seals the inner peripheral edges of the pair of diaphragms will move with the diaphragms toward the adjacent active plate 24, which in turn will be forced against one of the driven members 10, 11 or 12 in accordance with the clutch assembly which is in operation.

The diaphragms, which as heretofore stated, are of the Belleville washer type are normally concave and maintain their concave shape even under pressure from the fluid and during the course of operation. In other words, the concave pair of diaphragms 25 of each fluid chamber shift as a unit and in concave form carrying with them the inner ring structure 27 which is suitably sealed by a gasket 30 with the inner periphery of the partition 20. The rings 27 of each fluid motor will move longitudinally when high pressure is applied and will move with the diaphragms toward the medial adjacent bead 24ᵇ of the active plates 24. Due to the structure and the assembly of the clutch the force acts on the pressure plate always in a horizontal direction or in the direction of the axis of the shaft, thus preventing canting or unbalancing of the pressure plates.

As previously suggested in order to balance this condition and prevent any self-injury on the clutch system, there is provided a low pressure chamber at the opposite side of the pressure plates which normally has substantially the same capacity as the high pressure chamber. If both the high and low pressure chambers are filled with oil, and it is spun around, then the centrifugal forces within the system are in equilibrium. This construction has a tremendous effect on the success of the operation of the clutch. The fluid pressure itself, as applied to the active clutch plate, unbalances the static condition and represents the operating pressure. In order to apply high pressure on the clutch you will have to apply pressure through the control lines 40 which lead into the high pressure chambers. A separate oil line connects the high pressure chamber of each individual clutch as shown in Fig. 1. There is a normal low pressure line to the low pressure side of each clutch as shown in Fig. 4 which together with the leakage about the inner ring establishes low pressure chambers in each clutch at all times including that period when high pressure is applied to the high pressure chamber to operate the associated clutch. The operation of each clutch must therefore be accomplished by overcoming the pressure in the low pressure chamber. The necessary pressure for accomplishing the operation of the clutches necessarily includes those pressures developed as a result of centrifugal action in the clutch chambers. If all the fluid chambers of each of the clutches were full of fluid at all times, these clutch plates would be balanced at each side of the inner pressure plate or partition 20. The diaphragm has a certain tension which normally keeps the ring moved in the location that is shown in the sketch with the low and high pressure chambers of substantially equal capacity. It will be noted that the shape of each of the diaphragms is such that these diaphragms are maintained in such a position that the feed lines to the low pressure chambers are normally open to receive fluid.

The diaphragm for the low pressure chamber, it will be noted, is normally free of contact of the pressure plate and therefore the pressure at any one point in the low pressure chamber is not sufficient to distort the low pressure diaphragm but only sufficient to maintain both of the diaphragms in their normal unsprung position. The pressures on the diaphragms are not determined by the volume between the diaphragm and the backing plate but only by the area in the longitudinal projection. Both of the pressure chambers (low and high pressure) are substantially the same volume, but this is not important because the actual working pressures are in the direction of the longitudinal axis of the structure or horizontally of the structure.

For the purpose of illustration the gear associated with the present clutch assembly involves three planetary gear trains, with the various speed ratios engaged hydraulically by the three disc clutches hertofore described, and with the association of three friction drums or brakes connected into and with the planetary gear trains. The transmission is of the general type of my prior application Ser. No. 2,293, filed January 14, 1948, and a single shift lever or gear selector is employed and may be located at any desired place, such as on the steering column or wherever is convenient to the driver.

Figure 3:
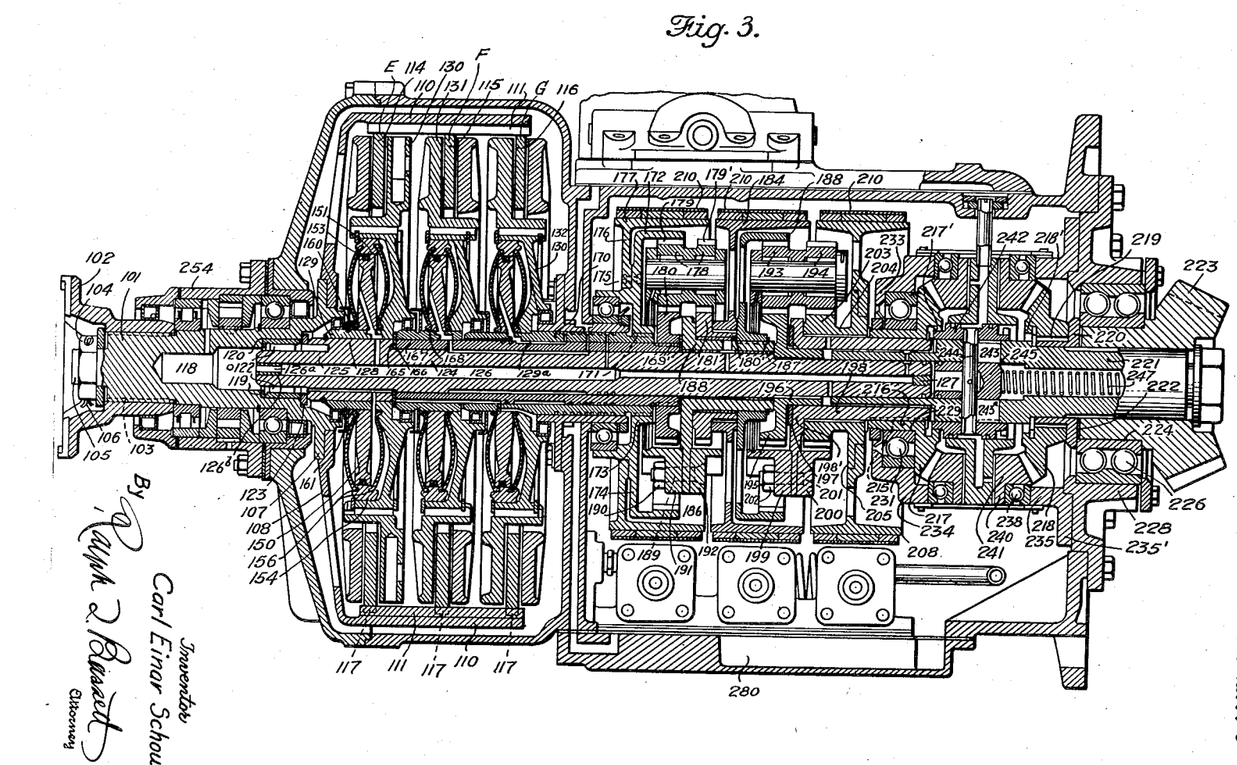
Fig. 3 is a longitudinal section of a modified form of the invention.

Referring now to Fig. 3, which illustrates a modification of the invention, power is transmitted to the input shaft 101 through yoke 102 which is splined to the shaft 101 as indicated at 103 and retained in position by nut 104 threaded on the reduced shaft extremity 105 and locked in position by the cotter pin 106. The shaft 101 is provided with an annular flange 107 to which is secured the drum type flywheel 108 by rivets or the like. The drum cylinder 110 is provided with a plurality of keys 111 forming splines, which may be secured by rivets or these keys may be formed as an integral part of the drum assembly. Suitably spaced within the drum 110 of the flywheel are three clutches E, F and G each having a friction plate 114, 115 and 116, respectively, these plates having their outer peripheral edges notched to receive the keys 111, as indicated in dotted line at 117.

The input shaft 101 has its inner end axially bored to provide a fluid chamber 118, the wall of this chamber at the inner end of the shaft being formed with an annular recess 119 defined at its inner end by the shoulder 120 and receives the bearing raceway in which are arranged the cylinder bearings 122.

For mounting a series of clutch structures and planetary assemblies three concentric shafts are provided. The inner of the concentric shafts indicated by reference character 124 has its reduced end portion 125 provided with an outer bearing surface for arrangement and rotation within the confines of the roller bearing assembly 122. A thrust ring 123 prevents displacement of the bearing 122 and is interposed between adjacent shoulders on the input shaft 101, and inner concentric shaft 124. The shaft 124 is formed with a central bore 126 throughout its entire length, the bore being open at the end 126ª in which there is provided a nipple 126ᵇ, and is closed at its opposite end by the plug 127. This nipple 126ᵇ forms a restriction for the cylindrical chamber 126. A multiplicity of lateral ports are provided in the shaft communicating with the central bore cylindrical chamber 126 for the purpose of permitting the circulation of the lubricant and control fluid. Also it will be noted that the axial bore 126 is of greater diameter throughout that portion defined by the end to end limits of the clutch assembly. The forward end of the shaft adjacent the reduced bearing extremity 125 is enlarged at 128 to provide for the reception of the hub 129, of the clutch member 130.

The structure of clutches E and F are substantially identical, the structure of these two clutches being comprehended by the clutch member 131 and the clutch plate assembly as shown in detail in my application Ser. 2,293. In the clutch structure G the hub 129ª of the member 132 is substantially elongated to extend within the partition wall of the main housing. The elongated hub 129ª terminates in a gear structure 171 which forms a part of the first planetary assembly as hereinafter described. The elongated hub 129ª thus forms the third or outer concentric shaft.

In the present design the three clutches are each furnished with a balanced pressure system. Each clutch includes the rotating piston 150, sealed and enclosed between the two diaphragms 156, and an outer ring 154, which provides two chambers, each of which are connected to their separate hydraulic pressure system. One chamber is connected to the high pressure system which actuates the clutch and the other side is connected to the low pressure system. Both of the chambers are connected to the transmission lubricating system and thus as the pressure areas are identical, the specific gravity of the fluid in the two systems also are identical and any centrifugal affect upon the clutch pressure plate is eliminated regardless of the rotational speed. In the operation of the clutches the application of high pressure causes a shifting of the two concave plates together with their ring-like pistons 154, the movement of the pistons engaging the shiftable clutch plates 130 to cause the engagement of the clutch parts and the connection of the drive to the associated assembly. As previously stated, the pressure in the two cylinders at each side of the fixed members 150 is substantially balanced and the application of high pressure to the high presesure side unbalances the static condition and produces the essential actuating pressure. The ring-like member 154 which moves with the diaphragms 156 shifts in a horizontal plane or axially of the assembly, this movement being brought about by the action of the forces as well as due to the novel structure and prevents canting or unbalancing of the pressure plates.

Within the open wall chamber formed by the clutch member 130 there is arranged a piston 150, this piston being fixed on the hub 129 and in the form of a circular plate, the center portion of which is formed with an opening for seating about the hub 129. The peripheral edge portion 151 of the piston is provided with an annular channel in which is arranged an O-ring 153. As stated, the piston 150 is fixed against longitudinal movement but rotates with the hub 129 with the cylinder 154, the inner annular face of which cooperates with the O-ring 153 to provide a liquid seal between the parts. The cylinder 154 is formed as a ring structure being connected to the hub 129 and rotating with this part but being free to slide axially of the assembly. At each side of the piston there is provided a light metal diaphragm 156 the outer peripheral edge of each of the diaphragms 156 being sealed into the annular outer faces of the longitudinally slidable cylinder 154. The inner marginal edges of the diaphragms 156 are sealed to the fixed piston 150 at its junction with the hub 129 of the friction plate 130. A seal ring 160 is used to secure the forward diaphragm in place and a snap ring 161 seats in an annular groove in the hub 129 to lock seal in position. The inner end 165 of the enlarged portion 128 of shaft 124 is defined by an annular wall against which a thrust plate 166 is seated. Abutting this thrust plate is a second concentric shaft 167 upon which is fixed the hub 168 of the second dry clutch assembly. The inner end of shaft 167 is splined at 169 to the spur gear 180 forming the sun gear of a planetary as will be more fully described. The structure of the second dry clutch assembly F is identical in substance with the previous clutch structure E described, and for this reason the parts bear similar reference characters. The hub portion 170 of the clutch plate 130 of clutch assembly G forms the third or outer concentric output shaft, this hub extending through a partition wall in the casing and having its inner end 171 splined to the hub of internal ring gear 172. The internal gear 172 includes the hub portion 173 splined to the outer concentric output shaft 171 and the connecting web 174 which latter is secured by means of rivets 175 to the web structure 176 of the brake drum 177. Within and meshing with the internal ring gear 172 are a series of dual planetary pinion structures 178, the forward planetary pinion 179 meshing with the spur gear 180 splined to the inner end of the intermediate concentric shaft 167. The gear 180 forms one of the sun gears of the planetary assembly while the gear 181 forms the companion sun gear structure which meshes with planetary pinion 179'. The sun gear 181 has a hub 180' which is splined to the hub of the brake drum 184, this brake drum being fixed to the internal ring gear as in the first planetary structure. A hub structure 185 including an end disc portion 186 has the hub extremity splined at 187 for the reception of the splined hub portion of the adjacent internal gear member 188. The hub structure 185 has its disc-like end terminating in flattened end plate portions for clamping between the two sections of the planetary cage. The disc portion 186 of the hub 185 is bolted by means of bolts 189 secured by nuts 190 to the pinion carrier cage sections 191 and 192.

Dual pinions 193 and 194 are provided in this assembly as in the preceding assembly with the inner pinion 193 meshing with the ring gear 188 and with the sun gear 195, the sun gear 195 including a hub portion 196 splined on the inner concentric shaft 124. A thrust assembly is shown at 197 arranged between the adjacent flange 198' of hub 198 and the sun gear 195. The inner annular face of the disc or flange 198' of the hub 198 bears against this thrust assembly. The disc or flange structure 198' is bolted between the pinion carrier frame 199 and 200 by bolts 201 and cooperating nut 202. The inner pinion element 194 of the dual pinion structure meshes with the sun gear 203, this sun gear having a hub extension 204 flanged at 205, with this flange riveted to the web structure 207 of the brake drum 208.

It will be noted from the foregoing that the structure now embodies an inner shaft 124 with clutch means associated for cooperation with the friction plate 114 of the hollow flywheel 110, the second concentric shaft 167 associated through clutch parts with friction plate 115 carried by the drum 110 and outer concentric shaft 171 associated through clutch parts with the friction plate 116 of the flywheel assembly 110. The inner shaft 124 has fixed thereto the hub of sun gear 195 of the intermediate brake assembly while the intermediate concentric shaft 167 has fixed thereto the sun gear 180 of the planetary assembly of the first brake assembly. For the purpose of convenience these brake assemblies have been indicated as H, I, and K, and the clutch assemblies have been indicated as E, F, and G.

The several brake drums 177, 184 and 208 are associated with brake bands 210, these brake band structures each including an outer brake band and an inner brake band both of which are lined in the usual manner by suitable brake material.

The pinion carrier assembly 199—200 has its hub 198 of the intermediate plate elongated and splined at its outer end 215 to receive the collar or hub 216 of beveled gear structure 217, which latter is a part of the reverse gear assembly. This reverse gear includes in addition to beveled gear 217 which faces towards the outer end of the structure, the beveled gear 218 which faces inward toward gear 217 and is spaced therefrom and mounted on roller bearings 219 carried by the bearing collar 220. The bearing collar or inner race 220 is mounted on the output shaft 221 having a thrust plate or shim 222 arranged between its outer flanged end and the adjacent end of the output gear 223. The output gear 223 is formed with a machined portion 224 for supporting the inner race of the bearing assembly 226. The outer race of this assembly is confined between end plate 228 of the casing structure to be hereinafter described. The inner beveled gear 217 is machined at 229 to receive the inner race of the ball assembly 231, the outer race of which is retained by the collar portion 233 of the pinion carrier 234.

The pinion carrier 234 comprises a casing body of general cylindrical form having the inner wall portion 233 and the outer wall 235, the latter to be flanged as at 235', and bolted to the end plate 228 heretofore mentioned. At diametrically opposite points there is formed in the carrier structure 234 opposite pairs of radial openings each of which is adapted to receive the outer race of the ball bearing 238, the inner race of which is retained about the hub 240 of one of the four beveled pinions 241. The pinions 241 are associated with and mesh with the beveled gears 217 and 218 to form a reversing gear structure.

The reversing gear structure essentially includes a clutch mechanism the operation of which reverses the direction of rotation of the output shaft 221, it being apparent in the reversing gear structure of the present type that the gears 217 and 218, due to the association of the several pinions 241 are normally driven in reverse direction. The clutch gear 242 having teeth 243 at each end is adapted upon axial movement to alternately engage the teeth 217' and 218' on the beveled gears 217 and 218 respectively. The output shaft is provided with an elongated transverse slot 243 through which extends a hollow pin 244 having the oil duct therein. The pin 244 extends through the hollow portion of the piston 245 and is provided medially and within the piston with a port through which fluid from the ducts can be introduced under pressure within and behind the piston to urge the latter axially within the bore of the output shaft 221, and against the tension of spring 247 to shift the clutch gear 242 to its reverse position into engagement with the teeth 218' of reverse gear 218. The spring 247 opposes the movement of the piston 245 in the bore of the output shaft 221, the bore of the shaft being reduced towards its outer end to receive the spring 247. The clutch gear 242 and the operating piston 245 are provided with packing rings to prevent leakage of the actuating fluid which is under substantial pressure.

The entire assembly is enclosed in a housing formed of cylindrical sections. The housing is formed with a plurality of ducts which are connected with ports and ducts associated with the distribution of the controlling and lubricating fluid. These ducts will be hereinafter described.

For supplying necessary high pressure for operating the clutches and the reverse mechanism, and for supplying low pressure for lubricating the assembly and balance of the clutch operating mechanism, a novel pump assembly has been included at the input end of the shaft and within that section of the input housing indicated by reference character 254. The structure of the pump includes a housing formed by reducing the inner face of the casing having an intake connection and a discharge port. These ports are located at the bottom of the pump structure and radiate from spaced points between which is a partition secured against movement by a set screw. An intake chamber is formed in the housing at the end of the intake pipe and a discharge chamber is formed in the housing adjacent the discharge outlet. These chambers are partly defined by the partition heretofore mentioned. The oil sump is indicated at 280 and from this oil sump the pump draws the oil into the intake chamber of the pump. The rotation of the rotor of the pump assembly by cooperation with the roller pistons creates a pressure in the chamber but by-passes a certain portion of the fluid through a port for primary use in the lubrication of the assembly.

What is claimed is:

1. In a clutch assembly, a drive shaft, a clutch element, a driven drum having a pair of driven plates carried thereby and arranged at each side of the clutch plate, one of said driven plates being fixed and the other plate being shiftable for engagement with said clutch element, a fluid motor carried by said drum and arranged for actuating said shiftable plate, said fluid motor including an axially fixed backing plate of disc form carried by the drum, a pair of concave resilient parallel plates arranged at each side of the backing plate and spaced therefrom to provide chambers at each side of the axially fixed plate, an annular ring sealing the inner marginal edges of said resilient plates, and including an annular guide surface for normally engaging and forming a seal against the adjacent marginal edge of said axially fixed backing plate, port means for introducing low pressure fluid to each of said chambers, said port means being normally open to maintain the chambers under low pressure, and port means for introducing high pressure fluid into one of those chambers to unbalance the same with respect to the other chamber to cause a shifting of the resilient parallel plates to urge one of said plates into contact with the shiftable plate of the clutch assembly.

2. In a clutch assembly, a driven shaft, a clutch plate fixed to said shaft, a driving flywheel, a shiftable clutch member carried by said driving flywheel for engagement with the clutch plate to transmit torque from the driving flywheel to the driven member, means for shifting the shiftable clutch member comprising a fluid motor formed with spaced chambers having equal fluid areas, said chambers each including concave walls formed of resilient sheet metal, said walls being connected for simultaneous shifting movement, port means for introducing low pressure fluid into said chambers to maintain said resilient walls in their normal position, and port means for introducing high pressure fluid into one of said chambers to unbalance the fluid pressure therein to cause a shifting of the concave walls to operate the clutch members.

3. The substance of claim 2 characterized in that the pressure chambers are spaced by a fixed backing plate which latter is carried by the driving flywheel.

4. In a clutch structure, a driving rotor, an annular housing carried by the rotor, a driven clutch plate, said clutch plate being arranged between an axially fixed backing plate and an active pressure plate, said axially fixed backing plate and active pressure plate being carried by the rotor, means for shifting the active pressure plate into engagement with the clutch plate comprising a pair of fluid chambers formed by spaced parallel resilient concave plate members and an intermediate rigid plate member, said resilient plate member and rigid plate member being clamped and sealed at their outer periphery and having an inner end wall formed by an annular ring, said ring being of such a thickness as to normally space said resilient plate member from said rigid plate member, port means for introducing fluid into said chambers to maintain a static condition by centrifugal force upon rotation of said means, and port means for introducing a high pressure fluid to one of said chambers to unbalance the structure to cause a shifting of the spaced resilient walls into engagement with the active pressure plate to cause an operation of the clutch.

5. In a fluid clutch assembly including a driving clutch element and driven clutch element, the driving clutch element being shiftable for engagement with the driven clutch element, means for shifting said driving clutch element comprising a fluid motor having a shiftable cylinder formed in part of parallel concave annular ring-like plates of disc form, the inner marginal edges of said plates being normally spaced and sealed by a ring structure, the cylinder being partitioned by a rigid ring-like annular plate which is clamped between the outer marginal edges of said resilient plates to provide a pair of pressure chambers of equal area, open port means for supplying fluid for maintaining said pressure areas under substantially constant low pressure to position said resilient ring members in their normal predetermined position, and port means for introducing high pressure fluid into one of said chambers to unbalance the pressure of said chamber to cause the shifting of the concave plates and the engagement with said shiftable clutch plate to operate the same.

6. In a clutch assembly, a driven shaft, a clutch plate secured to the driven shaft, a backing plate for the clutch plate, an active pressure plate adapted to be urged against the clutch plate to bind the clutch plate against the backing plate, a driving rotor carrying said backing plate and pressure plate, fluid actuated means for shifting the pressure plate mounted on said rotor, said fluid actuated means comprising a pair of spaced parallel resilient sheet metal disc members having concave faces, said disc members being formed with central openings, a ring connecting the disc members about the marginal edges defining the central openings and providing a seal between said disc members, said ring extending between said plates and having its inner face defining an annular cylindrical surface, an annular backing plate arranged between said disc members and having its faces shaped to conform to the adjacent concave faces of said disc members, said backing plate having one marginal edge portion engaging the annular face of said ring member and the other edge portion clamped between said flexible disc members to provide chambers at each side thereof, port means for supplying low pressure fluid to the chambers formed at each side of the concave plate member to maintain the disc members in predetermined spaced relation with respect thereto, and port means for admitting high pressure fluid to one of said chambers to unbalance the chamber pressure at one side of the backing plate to cause said discs to shift to engage the active pressure plate to operate said clutch members.

7. In a multiple clutch structure for use in a variable speed transmission, a plurality of shafts, a clutch plate carried by each shaft, a power driven drum concentrically arranged about said clutch plates, spaced axially fixed backing plates carried by the drum and arranged to cooperate with one side of each of the clutch plates, a plurality of shiftable plates carried by said drum for clutching engagement with the opposite side of said clutch plates on said shafts, and expansible motors associated with said clutches and carried by said drum, said expansible motors each including a pair of spaced resilient plates, a partition fixed to said drum defining high and low pressure chambers between each pair of resilient plates, means for supplying low pressure fluid to said fluid motor, and means for selectively supplying high pressure fluid to one of said fluid motor chambers to shift said flexible plates to cause their selective engagement with the shiftable plates of said clutch assemblies.

8. In a fluid clutch assembly including a driving clutch element and a driven clutch element, the driving clutch element being shiftable for engagement with the driven clutch element, means for shifting said driving clutch element comprising a fluid motor having a pair of concave flexible resilient spaced walls, means for sealing the radially inner portions of said walls to form a chamber, an intermediate axially fixed backing plate arranged medially of said chamber to partition the same, means for maintaining low pressure fluid in said chambers, and means for supplying high pressure fluid to one of said chambers to cause the flexible walls of said chamber to shift to engage and move the shiftable clutch plate into engagement with its associated plate.

9. In a clutch assembly, a driving flywheel, a driven shaft, an annular clutch plate on said driven shaft, an annular clutch element on said driving flywheel shiftable to engage the clutch element carried by said driven member, a fluid motor for moving the shiftable clutch element into engagement with the driven clutch plate, said fluid motor including a fluid chamber formed of a pair of concave annular resilient plates and a connecting inner ring, an axially fixed backing plate arranged medially of the flexible plates and forming a pair of fluid chambers having substantially uniform pressure areas, means sealing said chambers, a source of low pressure fluid, means for normally supplying said low pressure fluid to one of said chambers, a source of high pressure fluid, and means for selectively introducing high pressure fluids to the other chamber.

10. In a clutch assembly, a driven shaft, a clutch element carried thereby, a driving drum having a pair of driven plates carried thereby and arranged at each side of the clutch element, one of said driven plates being fixed and the other plate being shiftable for engagement with said clutch element, a fluid motor carried by said drum and arranged for actuating said shiftable plate, said fluid motor including an axially fixed backing plate of disc form carried by said drum, a pair of concave resilient parallel plates arranged at each side of said backing plate and spaced therefrom to provide high and low pressure chambers, means for connecting the ends of said resilient plates to seal said chambers, port means for normally supplying low pressure fluid to said chambers, and means for supplying high pressure to one of said chambers to unbalance the low pressure fluid to shift said resilient plates to cause the engagement of said clutch elements.

11. The substance of claim 10 characterized in that the high and low pressure chambers have substantially equal pressure areas.

12. In a clutch assembly, a driven shaft, an annular clutch plate splined to said shaft, a driving drum housing said shaft and clutch plate, said drum including an axially fixed backing plate and a shiftable plate for operative association with said driven plate carried by said shaft, means for operating said shiftable plate including a pair of spaced annular concave resilient plate members carried by said driving drum connected at their inner marginal edges by an annular member, said resilient plate members being arranged in parallel relation and having an axially fixed partition plate arranged medially therebetween to provide high and low pressure chambers with the same pressure areas, means sealing the ends of said plates to close said chambers, means normally supplying low pressure fluid to said chambers to maintain said plates in spaced relation with the enclosed partition plate, a source of high pressure fluid, and means for supplying the high pressure fluid to one of said chambers to cause a shifting of said resilient plate member and the engagement of said resilient plate member with said shiftable clutch plate.

13. In a multiple clutch assembly, a plurality of concentric shafts, each of said shafts being splined with an annular clutch plate, a driving drum enclosing said plates, shiftable clutch means carried by said drum for engaging each of said plates on said shafts to transmit the torque therefrom, a plurality of fluid motors carried by said drum, each fluid motor being associated with said shiftable clutch means to operate the same, said fluid motors each including a substantially rigid backing plate and concave resilient metallic walls arranged at each side of said backing plate and normally in spaced relation thereto, said walls being connected at their inner marginal edges by a ring member, means sealing the peripheral marginal portions of said resilient metallic walls to provide pressure chambers at each side of each backing plate, a source of low pressure fluid, means for supplying low pressure fluid to the pressure chambers, a source of high pressure fluid, and means for supplying the high pressure fluid selectively to one of said chambers to cause a simultaneous shifting of both of the resilient metallic walls and engagement of one of said resilient walls with said shiftable clutch means to operate the latter.

14. The substance of claim 13 characterized in that the ring member connecting the inner marginal edges of the resilient wall includes one face which normally engages the backing plate and forms a fluid seal therewith.

CARL EINAR SCHOU.

References Cited in the file of this patent

UNITED STATES PATENTS

| Number | Name | Date |
|---|---|---|
| 1,938,914 | Kress | Dec. 12, 1933 |
| 2,094,449 | Forichon | Sept. 28, 1937 |
| 2,328,090 | Nutt et al. | Aug. 31, 1943 |
| 2,381,786 | Tyler | Aug. 7, 1945 |
| 2,386,220 | Lawler et al. | Oct. 9, 1945 |
| 2,416,154 | Chilton | Feb. 18, 1947 |
| 2,482,460 | Browne | Sept. 20, 1949 |